July 7, 1931.    G. E. HOWARD    1,813,742
METHOD AND APPARATUS FOR FEEDING MOLTEN GLASS
Filed May 11, 1922    2 Sheets-Sheet 1
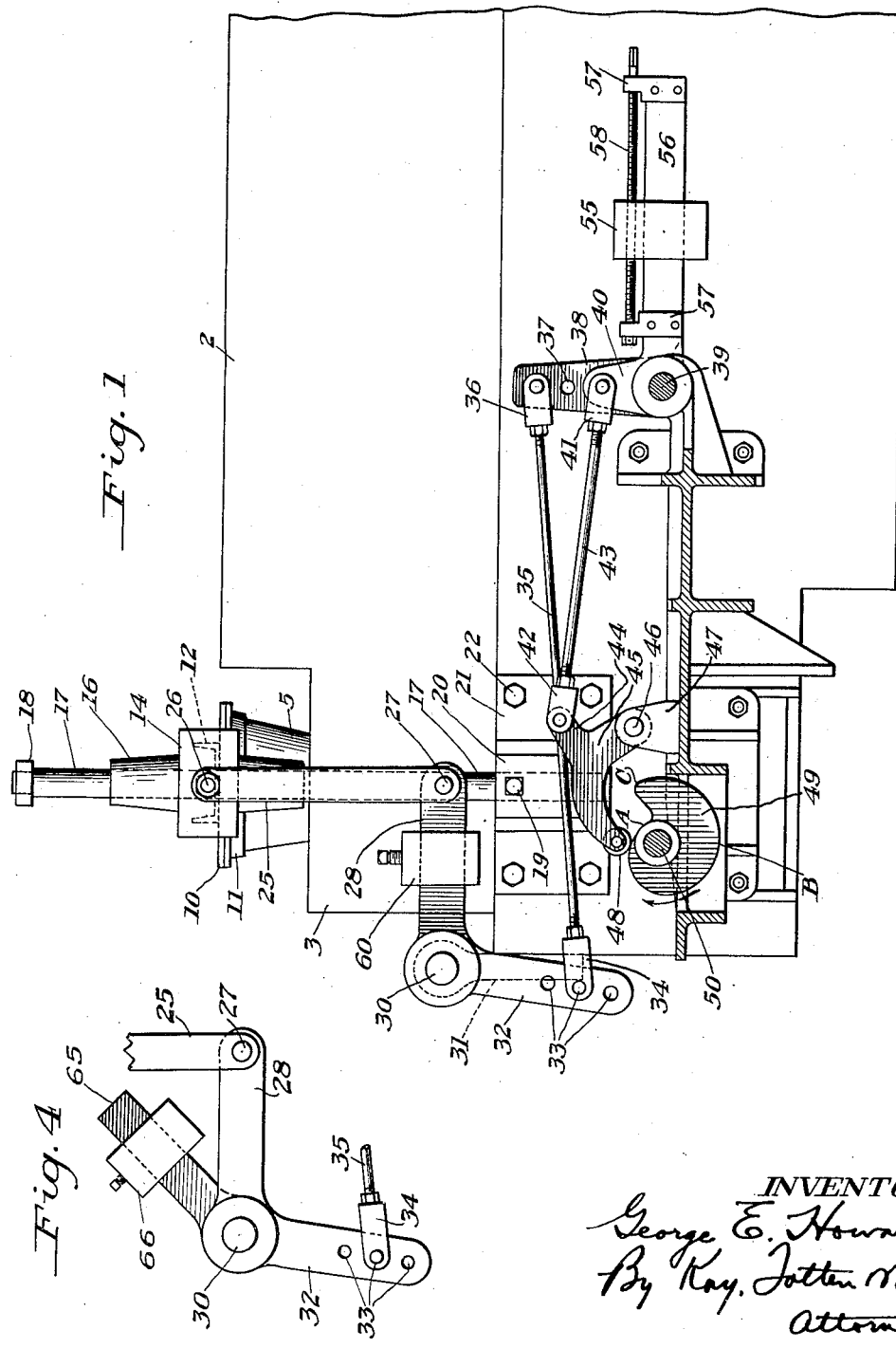

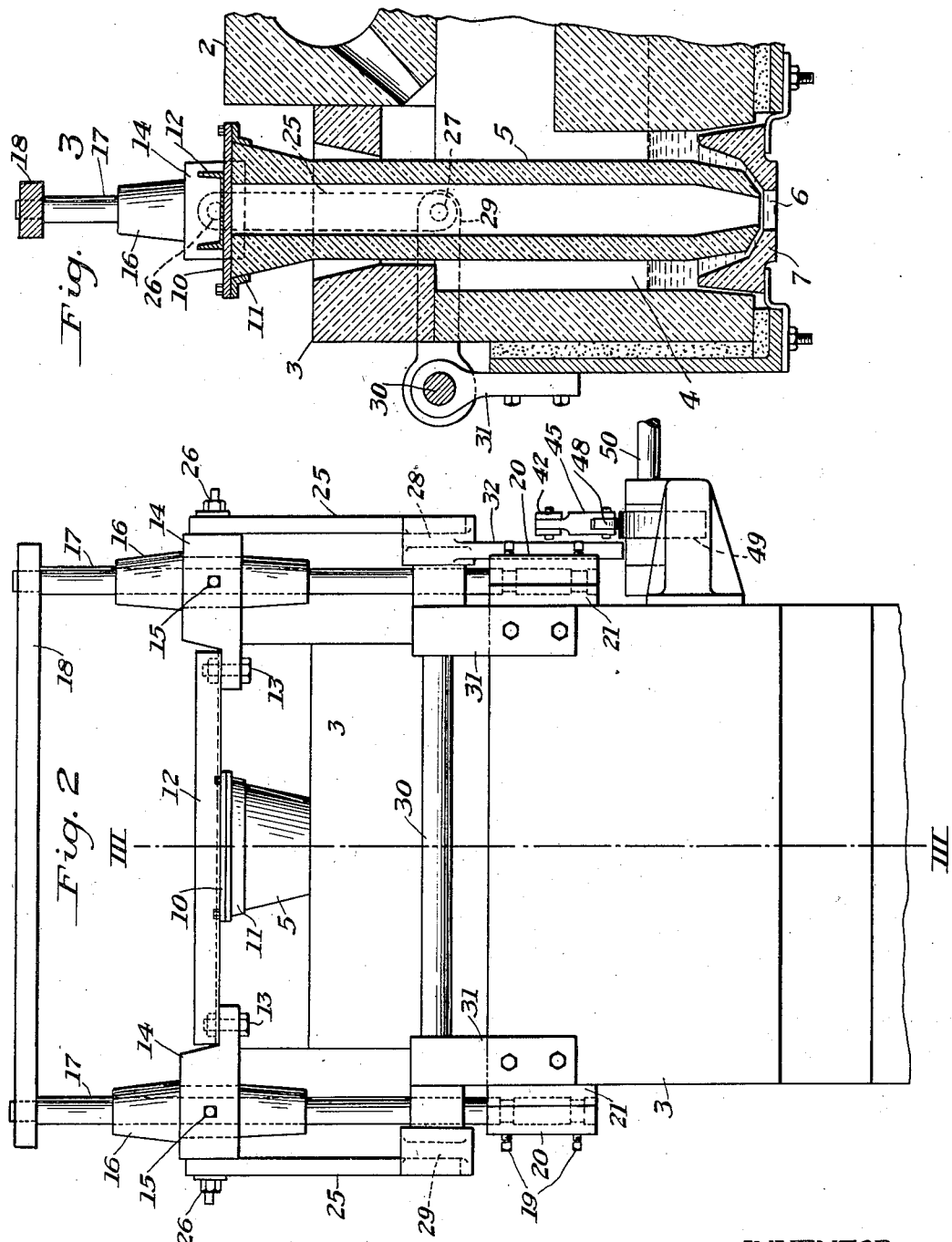

Patented July 7, 1931

1,813,742

UNITED STATES PATENT OFFICE

GEORGE E. HOWARD, OF BUTLER, PENNSYLVANIA, ASSIGNOR, BY MESNE ASSIGNMENTS, TO HARTFORD-EMPIRE COMPANY, OF HARTFORD, CONNECTICUT, A CORPORATION OF DELAWARE

METHOD AND APPARATUS FOR FEEDING MOLTEN GLASS

Application filed May 11, 1922. Serial No. 560,111.

My invention relates to the art of feeding molten glass to molds, and it has special reference to the system known as the suspended-charge feeding method, wherein mold charges are formed in succession and in free suspension at the outlet from a glass receptacle, and wherein each mold charge is cut off while still hanging freely, and is then received in a mold.

One typical suspended-charge feeding apparatus, as now in commercial use, includes a receptacle which receives glass from a tank and discharges the glass through an opening in the bottom of the receptacle, the discharge of glass through this opening being controlled by means of a vertical plunger which reciprocates vertically above the opening and, by applying successive downward impulses and upward retractions, causes the glass to issue from the opening in a series of more or less discontinuous masses, the shape of which is controlled by varying the time and amplitude of the plunger movements. My present invention relates to the means by which this plunger is raised, lowered and otherwise controlled.

One object of my invention is to provide a method and means for operating the plunger in glass feeders of the above indicated type, whereby the operator shall be able to control more flexibly and with greater ease the shape of the delivered gobs or mold charges of glass.

Another object of my invention is to provide a glass feeding method and means whereby the shape of the mold charges may be changed more quickly than in prior feeders for the purpose of compensating for changes in the temperature of the glass, the depth of glass above the discharge opening or other conditions which may have altered the shape of the gathers.

A further object of my invention is to provide a method and means whereby the plunger of a glass-feeder may be operated effectively without danger of breaking or otherwise damaging the plunger or the other parts of the feeder.

In glass-feeders where the glass is controlled by a vertically reciprocating cam-operated plunger it has heretofore been customary to raise and lower the plunger by means of a cam which lifts the plunger and then permits it to descend by gravity. The gravity descent of the plunger, however, is limited by the fact that the cam roller rests upon the cam throughout the downward movement of the plunger, so that the plunger is not free to fall by gravity, but descends at a rate which is controlled by the shape of the cam. The plunger is ordinarily made heavy enough to ride the cam constantly throughout the cycle of operations.

According to my present invention, I lift the plunger by positive means, specifically by means of a cam, then release the plunger after a suitable interval of pause, and permit the plunger to fall by gravity with a force which is made proportional to the desired glass-shaping impulse, and also proportional to the resistance encountered by the plunger as it descends through the molten glass above the outlet. In order to prevent damage to the plunger, and also to provide for convenient and flexible adjustment of the downstroke of the plunger, I balance a portion of the weight of the plunger and its associated parts by means of one or more counterweights which are so selected and adjusted as to give the plunger a resultant downward impulse by gravity. The downward movement of the plunger is thus checked by the inertia of the rising counterweight, and the downward speed of the plunger is thereby lessened to any desired extent, while at the same time the plunger is caused to exert the desired downward impulse.

The accompanying drawings show the manner in which I now prefer to construct my improved plunger-operating mechanism. Fig. 1 is a side elevational view, with parts in section, of a glass-feeder having plunger mechanism constructed according to my invention; Fig. 2 is a front elevational view of the construction shown in Fig. 1; Fig. 3 is a vertical sectional view through the plunger, the section being taken substantially on the line III—III, Fig. 2; and Fig. 4 is a partial side elevational view of a modified form of plunger-operating mechanism.

In the drawings, the numeral 2 indicates the housing of a glass feeder provided with an extension or boot 3 containing a discharge chamber 4 within which a hollow plunger 5 reciprocates vertically above a discharge opening 6 formed in a bushing 7. This feeder is of the same general type as that described and claimed in my copending application for Letters Patent, Serial No. 279,541, filed February 27, 1919. It will be understood, however, that this construction is herein shown only for the purpose of illustrating my invention, which may be applied equally well to any other form of glass-feeder of the plunger type wherein the movement of the plunger is relied upon to shape and control the discharge of the glass.

The hollow plunger 5 is suspended from a hanger plate 10 by means of a tapered ring 11 which is bolted to the under side of the plate 10. The plate 10 is attached to the under side of a hanger consisting of a channel bar 12, the ends of which are secured by means of bolts 13 to projections extending inwardly from two slide castings 14. The slide castings 14 are provided with vertical openings in which are secured, by means of set screws 15, slide bushings 16 which surround and slide upon vertical guide rods 17, the upper ends of which are connected by means of a bar 18, and the lower ends of which are secured by means of set screws 19 in supports 20 having flanges 21 which are attached by means of bolts 22 to the outer side wall of the discharge chamber 3.

For the purpose of reciprocating the slides 14 and the bushings 16 on the guide rods 17, two pitmen 25 are loosely pivoted at their upper ends to the slide castings 14 by means of bolts 26, and are loosely attached at their lower ends by means of pivot pins 27 to the outer ends of levers 28 and 29, both of which are carried by a horizontal rock shaft 30 extending across the front of the discharge chamber 3 and mounted in bearings 31 bolted to the front wall of the discharge chamber. The rock shaft 30 also carries a depending lever arm 32 which may be integral with the lever 28 and which is provided with several openings 33 for adjustably attaching a coupling 34 into which is screwed one end of a connecting rod 35, the other end of which is screwed into a similar coupling 36 that is attached to one of several openings 37 in a lever 38 which extends upwardly from a horizontal rock shaft 39. Other means of adjustment, in the nature of screws for example, may be used instead of the openings 33 and 37 for changing the effective length of the levers 32 and 38. The rock shaft 39 also carries a crank lever 40 which is connected by means of couplings 41 and 42, and a connecting rod 43, to an arm 44 projecting from a curved lever 45, one end of which is pivoted at 46 to a fixed support 47, while its other end carries a cam roller 48 resting upon the periphery of a cam 49 which is secured to a horizontal cam shaft 50 driven from any suitable source of power, not shown.

The cam 49 rotates continuously in a clockwise direction, as seen in Fig. 1, and operates through the roller 48 to rock the lever 45 about its pivot 46, thus reciprocating the connecting rod 43 and rocking the shaft 39. This rocking movement is communicated through the lever 38, the connecting rod 35 and the lever 32 to the rock shaft 30, and thence to the plunger-lifting levers 28 and 29. It will be seen that when the cam 49 raises the lever 45 this movement is communicated through the connections just described to raise the hollow plunger 5. This lifting movement takes place while the cam roller 48 is in engagement with that portion of the periphery of the cam 49 between the points A and B, since this portion of the cam surface is designed on a spiral curve. Between the points B and C the periphery of the cam 49 is concentric with the axis of the shaft 50, so that the lever 45, and the plunger 5 are held stationary in raised position while this concentric portion of the cam is passing beneath the cam roller 48. When the point C passes from beneath the roller 48 the plunger 5 and its operating connections are released entirely from the influence of the cam 48, and the tube 5 thereupon falls by gravity and causes the lever 45 to likewise descend until the cam roller 48 again strikes the periphery of the cam 49. The point at which the cam roller strikes the cam at this time will vary according to the resistance to the plunger offered by the molten glass, and also according to the speed at which the plunger has been adjusted to fall, this adjustment being effected by means of counterweights which will now be described.

I provide two counterweights or sets of counterweights. One of these is represented on Fig. 1 by a weight 55 which rests slidably upon a horizontal arm 56 that is rigidly secured to the rock shaft 39. The arm 56 also carries two supports 57 in which is journaled a screw shaft 58 which extends through a screw-threaded opening in the weight 55. By turning the screw shaft 58 by means of a suitable wrench, handle or other convenient means, the position of the weight 55 on the arm 56 may be quickly and accurately adjusted. The weight 55 tends to oppose the downward movement of the hollow plunger 5, and this counterbalancing effect is increased as the weight 55 is moved toward the outer end of the arm 56.

In addition to the weight 55 I also provide a weight 60 upon the plunger-lifting lever 28, and also, if desired, upon the plunger-lifting lever 29. The effect of the weight 60 is opposite to that of the weight 55, that is, it increases the weight of the plunger 5 and assists its downward movement in opposition to the counterbalancing weight 55.

Several of the weights 55 and the arms 56 may be employed, if desired, and the showing of the weights is intended to be merely illustrative and to represent any means for counterbalancing to an adjustable extent the weight of the plunger and its associated parts, which weight tends to lower the plunger by gravity when the cam roller 48 is released from the cam 49. The weight of the plunger itself may evidently be varied by placing weights on the hanger 12. It will thus be seen that I provide a variety of adjustments by which the effective weight of the plunger may be changed so that the plunger may be made to descend either rapidly or slowly with a given effective weight.

This adjustment of the speed at which the plunger descends, while keeping its effective weight constant, may be best understood by assuming that the actual weight of the plunger and its attachments is, for example, 50 pounds. If this weight is merely raised and allowed to fall by gravity a certain impulse will be exerted by the plunger at the bottom of its stroke. Suppose now, that the weight of the plunger and its attachments is doubled, and that half of this larger weight is counterbalanced by means of weights, such as the weights 55 and 60. The plunger, when allowed to fall by gravity, will evidently exert the same impulse at the bottom of its stroke as it exerted when its total weight was 50 pounds, but the plunger will descend more slowly because it must overcome the inertia of the counterweights in the course of its downward movement.

In feeders of the kind herein shown each mold charge of glass is produced in two stages, by first allowing part of the gather to flow by gravity through the outlet and then forcing out additional glass by the downward impulse of the plunger.

The reason for reciprocating the plunger in a feeder of this kind, is therefore, to impart shape to the mold charge masses that are produced beneath the glass outlet 6. This shape depends on several factors, among which are the relative proportions of the plunger and the well above the outlet, the speed of descent of the plunger, the temperature and consequent viscosity of the glass, and the height of glass over the orifice. Of these factors, temperature, viscosity and head of glass are all subject to variation, and such variations manifest themselves immediately by changing the shape of the mold charges.

In the usual feeder practice as heretofore carried out, where the plunger is controlled by a cam throughout its cycle of operations, the plunger descends at a rate of speed determined by the contour of the cam, and therefore it is not possible to change this speed of reciprocation without changing the cam or its speed of rotation. When it is recalled that these feeders operate to discharge gathers of glass at a rate as high as 40 or 50 per minute, it will be seen that the downward stroke of the plunger, which is the critical period of plunger operation, is very short, and that a small change in the time during which the plunger descends will make a relatively large difference in the effect which the plunger produces on the glass. If, for example, the descent of the plunger takes place during 30° of the cam rotation, while the rising and pausing periods occupy the remaining 330°, it will be seen that if the speed of descent of the plunger is decreased so that 45° of cam rotation are consumed in its descent, this is an increase of 50% in the time of downward movement of the plunger, but a change of less than 10% in the remainder of the cycle.

If the feeder is operating normally and producing pendant mold charge masses of the desired shape, for example, cylindrical gathers having rounded upper and lower ends, and if the glass should suddenly become hotter and thinner, each mold charge masses as it is produced beneath the outlet 6 will stretch and pull away from the outlet more quickly than before, thus making a longer and thinner mass. To compensate for this I move the counterweights 55 or 60, or both of these, to the left, as seen in Fig. 1, thus reducing the counterbalancing effect on the plunger and permitting the plunger to descend more quickly and with increased force. This causes the impulse which is exerted during the formation of each mold charge mass to be applied more quickly and intensely, and therefore the glass is forced out through the orifice at a correspondingly faster rate and in a correspondingly shorter period of time, thereby maintaining the correct shape of the mold charge masses in spite of the change in the consistency of the glass. However, the speed at which the mold charges are produced is unchanged. That is to say, the same number of charges are delivered each minute, but each mold charge mass is produced in a shorter fraction of that minute.

Much the same result is produced if the glass should, for any reason, rise too high in the discharge chamber, and is compensated for in the same way.

If the glass should become slightly chilled, or should be of less than the normal depth in the discharge chamber, the flow of glass through the outlet 6 will tend to decrease, with the result that the charges produced will be shorter than the normal charges. I compensate for such changes in the condition of the glass by moving the counterweights 55 or 60, or both of these weights, to the right in Fig. 1, thereby increasing the counterbalancing effect of these weights on the plunger 5 and causing the plunger to descend more slowly. This gives the glass a slightly longer period in each cycle during which it flows through the outlet 6, thereby compensating for the slower rate at which the glass flows, due to its greater viscosity.

It will thus be seen that the operation of my plunger may be changed, by merely adjusting the positions of the counterweights, to feed charges of a wide variety of shapes without replacing any of the parts of the machine.

The adjustable counterweights also make it possible to somewhat alter the weight of the gathers as well as their shape, although in my preferred feeding system the weight of the gathers is mainly controlled by the back valve described and claimed in my prior applications, Serial No. 279,541, filed February 27, 1919, and Serial No. 560,112, filed May 11, 1922, on which Patent No. 1,544,987 was granted July 7, 1925.

It will also be noted that the adjustment of the counterweights necessary to change the timing of the plunger may be effected very rapidly, so that any changes that may appear in the shape of the mold charges may be corrected almost instantly, thus saving much of the cullet losses and defective ware which ordinarily accompany changes in feeder operation.

It will also be noted that when the plunger is counterweighted it descends gently and the plunger and the other clay parts are therefore not subject to the jarring and breakage which are a frequent source of difficulty in operating feeders of this type.

Another feature of my invention is shown in Fig. 4 and consists in the use of auxiliary weights or levers so arranged that the effective gravity force or weight of the descending plunger can be caused to increase or decrease during each downward stroke of the plunger. As shown in Fig. 4, an inclined arm 65 is secured to the rock shaft 30 and carries an adjustable weight 66. When the plunger is raised, the weight 66 approaches the vertical plane passing through the axis of the rock shaft 30, and therefore its leverage upon the rock shaft is reduced. When the plunger descends, the arm 65 rocks to the right, Fig. 4, thereby carrying the weight further away from this vertical plane, which progressively increases the leverage exerted by the weight 66 upon the shaft 30. This increasing leverage is transmitted to the plunger through the levers 28—29, pitmen 25 and hanger 12, so that the downward force exerted by the plunger on the glass is increased as the plunger descends. If it should be desired to decrease the force of the plunger during its descent, it is only necessary to incline the arm 65 to the left above the rock shaft 30 instead of to the right as in Fig. 4.

My invention has the following novel characteristics.

First: Variation of the weight of the moving parts of the feeder is utilized for the purpose of modifying the effect of the plunger stroke.

Second: The effective weight of the plunger and its associated parts may be varied during the descent of the plunger.

Third: The downwardly moving parts are counterbalanced by upwardly moving parts, so that, for equal resultant downward impulses exerted by the plunger, the speed at which the plunger descends may be varied.

The accompanying drawings show the manner in which I now prefer to construct my invention. It will be understood, however, that various changes may be made in the form and arrangement of parts within the limits of my invention as set forth in the appended claims.

I claim as my invention:

1. The method of utilizing a vertically reciprocating plunger to control the delivery of molten glass through a downwardly opening outlet, that comprises causing said plunger to fall by gravity toward said outlet and varying the weight of the plunger that is effective to produce the downward stroke of said plunger to impel the glass through said outlet.

2. The method of utilizing a vertically reciprocating plunger to control the delivery of molten glass through a downwardly opening outlet, that comprises causing said plunger to fall by gravity toward said outlet and causing the weight of said plunger, that is effective to produce the downward stroke of said plunger to impel the glass through said outlet, to change during the said downward stroke of said plunger.

3. The method of utilizing a vertically reciprocating plunger to control the delivery of molten glass through a downwardly opening outlet, that comprises causing said plunger to fall by gravity toward said outlet and causing the weight of said plunger, that is effective to produce the downward stroke of said plunger to impel the glass through said outlet, to increase during the said downward stroke of said plunger.

4. The method of utilizing a vertically reciprocating plunger to control the delivery of molten glass through a downwardly opening outlet, that comprises causing said plunger to fall by gravity toward said outlet and counterbalancing a portion of the weight of said plunger with a weight movable upward when said plunger moves downward.

5. The method of utilizing a vertically reciprocating plunger to control the delivery of molten glass through a downwardly opening outlet, that comprises causing said plunger to fall by gravity toward said outlet and counterbalancing a portion of the weight of said plunger with a weight movable upward when said plunger moves downward, and varying the effective amount of said counterbalance, thereby producing a corresponding change in the downward movement of said plunger.

6. The method of utilizing a vertically reciprocating plunger to control the delivery of molten glass through a downwardly opening outlet, that comprises causing said plunger to fall by gravity toward said outlet and counterbalancing a portion of the weight of said plunger with a weight movable upward when said plunger moves downward, and varying the position of said weight to cause variations in the counterbalancing effect thereof.

7. The method of feeding molten glass that comprises flowing the glass through a downwardly opening outlet, periodically lifting an impulse member vertically above said outlet, permitting said member to fall freely toward said outlet and thereby applying an impulse to the issuing glass, and varying the effective weight of said impulse member in accordance with the nature of the glass and the shape to be imparted to the issuing glass.

8. The method of feeding molten glass that comprises flowing the glass through a downwardly opening outlet, periodically lifting an impulse member vertically above said outlet, permitting said member to fall freely toward said outlet and thereby applying an impulse to the issuing glass, and variably counterbalancing a portion of the weight of said member.

9. The method of feeding molten glass that comprises flowing the glass through a downwardly opening outlet, periodically lifting an impulse member vertically above said outlet, permitting said member to fall freely toward said outlet and thereby applying an impulse to the issuing glass, and causing the effective weight of said impulse member to vary during the downward stroke thereof.

10. The method of feeding molten glass that comprises flowing the glass through a downwardly opening outlet, periodically lifting an impulse member vertically above said outlet, permitting said member to fall freely toward said outlet and thereby applying an impulse to the issuing glass, and causing the effective weight of said impulse member to increase during the downward stroke thereof.

11. Glass feeding apparatus comprising a receptacle for molten glass having a discharge opening in its bottom, a vertical plunger mounted for vertical reciprocation above said opening, means for lifting said plunger and then permitting said plunger to fall toward said opening independently of said lifting means, and means for varying the weight of said plunger which is effective in producing said falling movement.

12. Glass feeding apparatus comprising a receptacle for molten glass having a discharge opening in its bottom, a vertical plunger mounted for vertical reciprocation above said opening, means for lifting said plunger and then permitting said plunger to fall toward said opening independently of said lifting means, and means for causing the weight of said plunger which is effective in producing said falling movement to change during the descent of said plunger.

13. Glass feeding apparatus comprising a receptacle for molten glass having a discharge opening in its bottom, a vertical plunger mounted for vertical reciprocation above said opening, means for lifting said plunger and then permitting said plunger to fall toward said opening independently of said lifting means, and means for causing the weight of said plunger which is effective in producing said falling movement to increase during the descent of said plunger.

14. Glass feeding apparatus comprising a receptacle for molten glass having a discharge opening in its bottom, a vertical plunger mounted for vertical reciprocation above said opening, means for lifting said plunger and then permitting said plunger to fall by gravity toward said opening independently of said lifting means, and a counterweight balancing a portion of the weight of said plunger and movable upward when said plunger moves downward.

15. Glass feeding apparatus comprising a receptacle for molten glass having a discharge opening in its bottom, a vertical plunger mounted for vertical reciprocation above said opening, means for lifting said plunger and then permitting said plunger to fall by gravity toward said opening independently of said lifting means, and a counterweight balancing a portion of the weight of said plunger and movable upward when said plunger moves downward.

16. Glass feeding apparatus comprising a receptacle for molten glass having a discharge opening in its bottom, a vertical plunger mounted for vertical reciprocation above said opening, means for lifting said plunger and then permitting said plunger to fall by gravity toward said opening independently of said lifting means, a counterweight balancing a portion of the weight of said plunger, and means for varying the plunger-balancing effect of said counterweight.

17. Glass feeding apparatus comprising a receptacle for molten glass having a discharge opening in its bottom, a vertical plunger mounted for vertical reciprocation above said opening, means for lifting said plunger and then permitting said plunger to fall by gravity toward said opening independenly of said lifting means, a counterweight balancing a portion of the weight of said plunger, a lever carrying said counterweight, means for shifting said weight upon said lever, and connections between said lever and said plunger, whereby change in the position of said counterweight upon said lever varies the plunger-balancing effect of said counterweight.

18. Glass-feeding apparatus comprising a receptacle for molten glass having a discharge opening in its bottom, a vertical plunger mounted for vertical reciprocation above said opening, and means for reciprocating said plunger comprising a cam operatively connected to lift said plunger and thereafter to permit said plunger to fall by gravity independently of said cam, and means for varying the weight of said plunger that is effective during the downward stroke of said plunger to impel glass through said opening.

19. Glass feeding apparatus comprising a receptacle for molten glass having a discharge opening in its bottom, a vertical plunger mounted for vertical reciprocation above said opening, and means for reciprocating said plunger comprising a cam operatively connected to lift said plunger and thereafter to permit said plunger to fall by gravity independently of said cam, and a counterweight balancing a portion of the weight of said plunger during its descent.

20. Glass feeding apparatus comprising a receptacle for molten glass having a discharge opening in its bottom, a vertical plunger mounted for vertical reciprocation above said opening, and means for reciprocating said plunger comprising a cam operatively connected to lift said plunger and thereafter to permit said plunger to fall by gravity independently of said cam, a counterweight balancing a portion of the weight of said plunger during its descent, and means for varying the plunger-balancing effect of said counterweight.

21. Glass feeding apparatus comprising a receptacle for molten glass having a discharge opening in its bottom, a vertical plunger mounted for vertical reciprocation above said opening, and means for reciprocating said plunger to cause the plunger on its downstroke to accelerate and on its upstroke to retard flow of glass through the discharge opening, said plunger reciprocating means comprising means for raising said plunger, for causing said plunger to pause at the top of its stroke, and for then permitting said plunger to fall freely toward said outlet independently of said lifting means, and means independent of the glass in contact with the plunger for regulably controlling the rate of descent of the plunger.

22. Glass feeding apparatus comprising a receptacle for molten glass having a discharge opening in its bottom, a vertical plunger mounted for vertical reciprocation above said opening, and means for reciprocating said plunger to cause the plunger on its downstroke to accelerate and on its upstroke to retard flow of glass through the discharge opening, said plunger reciprocating means comprising a constantly rotatable cam, a lever having a roller engaging the periphery of said cam, and operative connections between said lever and said plunger, the said cam having its periphery divided into a lifting portion, a concentric portion, and a third portion which permits said roller to fall freely toward said cam and out of contact therewith.

23. Glass feeding apparatus comprising a receptacle for molten glass having a discharge opening in its bottom, a vertical plunger mounted for vertical reciprocation above said opening, and means for reciprocating said plunger to cause the plunger on its downstroke to accelerate and on its upstroke to retard flow of glass through the discharge opening, said plunger reciprocating means comprising a constantly rotatable cam, a lever having a roller engaging the periphery of said cam, and operative connections between said lever and said plunger, the said cam having a spirally curved lifting portion, a concentrically curved portion for holding said plunger stationary at the top of its stroke, and a third portion cut away to permit said plunger to fall freely toward said outlet independently of said cam.

24. Glass feeding apparatus comprising a receptacle for molten glass having a discharge opening in its bottom, a vertical plunger mounted for vertical reciprocation above said opening, and means for reciprocating said plunger comprising a cam, a lever having a roller running upon the periphery of said cam, a rock shaft, connections for rocking said shaft in response to movement of said lever, an arm carried by said rock shaft, a weight slidably mounted on said arm, a lever carried by said rock shaft, a second rock shaft, connections for rocking said second shaft in response to rocking movement of said first shaft, and levers carried by said second rock shaft and operatively connected to lift said plunger, the said cam being so shaped as to lift said plunger and to thereupon permit said plunger to fall independently of said cam.

25. Glass feeding apparatus comprising a receptacle for molten glass having a discharge opening in its bottom, a vertical plunger mounted for vertical reciprocation above said opening, and means for reciprocating said plunger comprising a cam, a lever having a roller running upon the periphery of said cam, a rock shaft, connections for rocking said shaft in response to movement of said lever, an arm carried by said rock shaft, a weight slidably mounted on said arm, a lever carried by said rock shaft, a second rock shaft, connections for rocking said second shaft in response to rocking movement of said first shaft, levers carried by said second rock shaft and operatively connected to lift said plunger, the said cam being so shaped as to lift said plunger and to thereupon permit said plunger to fall independently of said cam, and a weight adjustably carried by one of said plunger-lifting levers.

26. Glass feeding apparatus comprising a receptacle for molten glass having a discharge opening in its bottom, a vertical plunger mounted for vertical reciprocation above said opening, and means for mounting and guiding said plunger comprising a hanger, a ring secured beneath said hanger and adapted to rigidly clamp the upper end of said plunger to said hanger, supports for said hanger, hollow guide members carried by said supports, vertical guide rods upon which said hollow members are arranged to slide, and means for raising and lowering said hanger supports.

27. Glass feeding apparatus comprising a receptacle for molten glass having a discharge opening in its bottom, a vertical plunger mounted for vertical reciprocation above said opening, and means for mounting and guiding said plunger comprising a horizontal bar, a hanger plate secured to the underside of said bar, a tapered ring secured to the underside of said plate and engaging said plunger, slide castings supporting the opposite ends of said bar, slide bushings carried by said slide castings, vertical guide rods upon which said bushings are arranged to slide, and means for raising and lowering said hanger supports.

28. Glass feeding apparatus comprising a receptacle for molten glass having a discharge opening in its bottom, a vertical plunger mounted for vertical reciprocation above said opening, and means for mounting and guiding said plunger comprising a horizontal bar, a hanger plate secured to the underside of said bar, a tapered ring secured to the under side of said hanger plate and engaging an upwardly flaring portion of said plunger, slide castings to which the ends of said bar are removably secured, slide bushings removably secured in vertical openings in said slide castings, vertical guide rods upon which said bushings are arranged to slide, means for removably supporting the lower ends of said vertical rods, a bar removably connecting the upper ends of said vertical guide rods, and lifting pitmen having their upper ends loosely pivoted to said slide castings.

29. Glass feeding apparatus comprising a receptacle for molten glass having a discharge opening in its bottom, a vertical plunger mounted for vertical reciprocation above said opening, and means for reciprocating said plunger comprising a cam, a lever having a roller running upon the periphery of said cam, a rock shaft, connections for rocking said shaft in response to movement of said lever, a second rock shaft, a link connection between said rock shafts whereby the rocking movement of one shaft is imparted to the other, means operatively connecting said second rock shaft to lift said plunger, the said cam being so shaped as to lift said plunger and to thereupon permit said plunger to fall independently of said cam, and means for adjusting said link relative to the rock shafts to change the range of the plunger stroke.

30. Glass feeding apparatus comprising a receptacle for molten glass having a discharge opening in its bottom, a vertical plunger mounted for vertical reciprocation above said opening, and means for reciprocating said plunger comprising a cam, a lever having a roller running upon the periphery of said cam, a rock shaft, connections for rocking said shaft in response to movement of said lever, a second rock shaft, a link connection between said rock shafts whereby the rocking movement of one shaft is imparted to the other, means operatively connecting said second rock shaft to lift said plunger, the said cam being so shaped as to lift said plunger and to thereupon permit said plunger to fall independently of said cam, and means for adjusting the pivotal connection between said link and at least one of said rock shafts to change the range of the plunger stroke.

31. In apparatus for feeding molten glass from a receptacle having a discharge outlet, a reciprocable implement for regulating the discharge of glass from the outlet, means for reciprocating the implement toward and from said outlet comprising a cam, a pivotally mounted lever arranged to be rocked by said cam, a rock shaft, link connections for rocking said shaft in response to movements of said lever, an arm carried by said rock shaft, a weight slidably mounted on said arm, the said cam being so shaped as to lift said implement and to thereupon permit the implement to fall independently of said cam, means for adjusting the link connections relative to the rock shafts to change the stroke of said implement, and means for adjusting said weight on said arm to regulate the downward movement of said plunger.

32. In apparatus for feeding molten glass from a receptacle having a discharge outlet, a reciprocable plunger for regulating the discharge of glass from the outlet, means for reciprocating the plunger toward and from said outlet comprising a rock shaft having a weight adjustably mounted thereon to counteract the movement of said plunger, a second rock shaft having a weight adjustably mounted thereon to add to the weight of said plunger, a link connection between said rock shafts, means for changing said link connection relative to said rock shafts to vary the stroke of said plunger, and means for adjusting each of said weights on the respective rock shafts during the reciprocations of the plunger to vary the impulse of the plunger on the glass at the discharge outlet.

33. The method of utilizing a vertically reciprocating plunger to control the delivery of molten glass through a downwardly opening outlet, that comprises causing said plunger to fall freely by gravity toward said outlet and regulably controlling the speed of the gravity descent of the plunger toward said outlet independently of any change in the condition of the glass in contact with the plunger.

34. The method of utilizing a vertically reciprocating plunger to control the delivery of molten glass through a downwardly opening outlet, that comprises causing said plunger to fall freely by gravity toward said outlet and changing the speed of the gravity descent of said plunger during its downward stroke toward the outlet independently of any change in the condition of the glass in contact with the plunger.

35. The method of utilizing a vertically reciprocating plunger to control the delivery of molten glass through a downwardly opening outlet, that comprises causing said plunger to fall freely by gravity toward said outlet and causing the speed of the gravity descent of the plunger to increase during said downward stroke of the plunger by increasing the effective weight on said plunger during its downstroke.

36. The method of feeding molten glass that comprises flowing the glass through a downwardly opening outlet, periodically lifting an impulse member vertically above said outlet, permitting said member to fall freely toward said outlet and thereby applying an impulse to the issuing glass, counterbalancing a portion of the weight of the falling plunger and varying the speed of gravity descent of said impulse member in accordance with the nature of the glass and the shape to be imparted to the issuing glass by varying the extent of the partial counterbalancing of the plunger.

37. Glass feeding apparatus comprising a receptacle for molten glass having a discharge opening in its bottom, a vertical plunger mounted for vertical reciprocation above said opening, means for lifting said plunger and then permitting the plunger to fall toward said opening independently of said lifting means, and means independent of the glass and of said lifting means for varying the speed at which said plunger will fall toward said opening.

38. Glass feeding apparatus comprising a receptacle for molten glass having a discharge opening in its bottom, a vertical plunger mounted for vertical reciprocation above said opening, means for lifting said plunger and then permitting said plunger to fall toward said opening independently of said lifting means, and means independent of the glass and of said lifting means for causing the speed at which said plunger will fall toward said opening to change during the descent of said plunger.

39. Glass feeding apparatus comprising a receptacle for molten glass having a discharge opening in its bottom, a vertical plunger mounted for vertical reciprocation above said opening, means for lifting said plunger and then permitting said plunger to fall toward said opening independently of said lifting means, and means independent of the glass and of said lifting means for causing the speed at which said plunger will fall toward said opening to increase during the descent of said plunger.

In testimony whereof I the said GEORGE E. HOWARD have hereunto set my hand.

GEORGE E. HOWARD.